No. 755,606. Patented March 29, 1904.

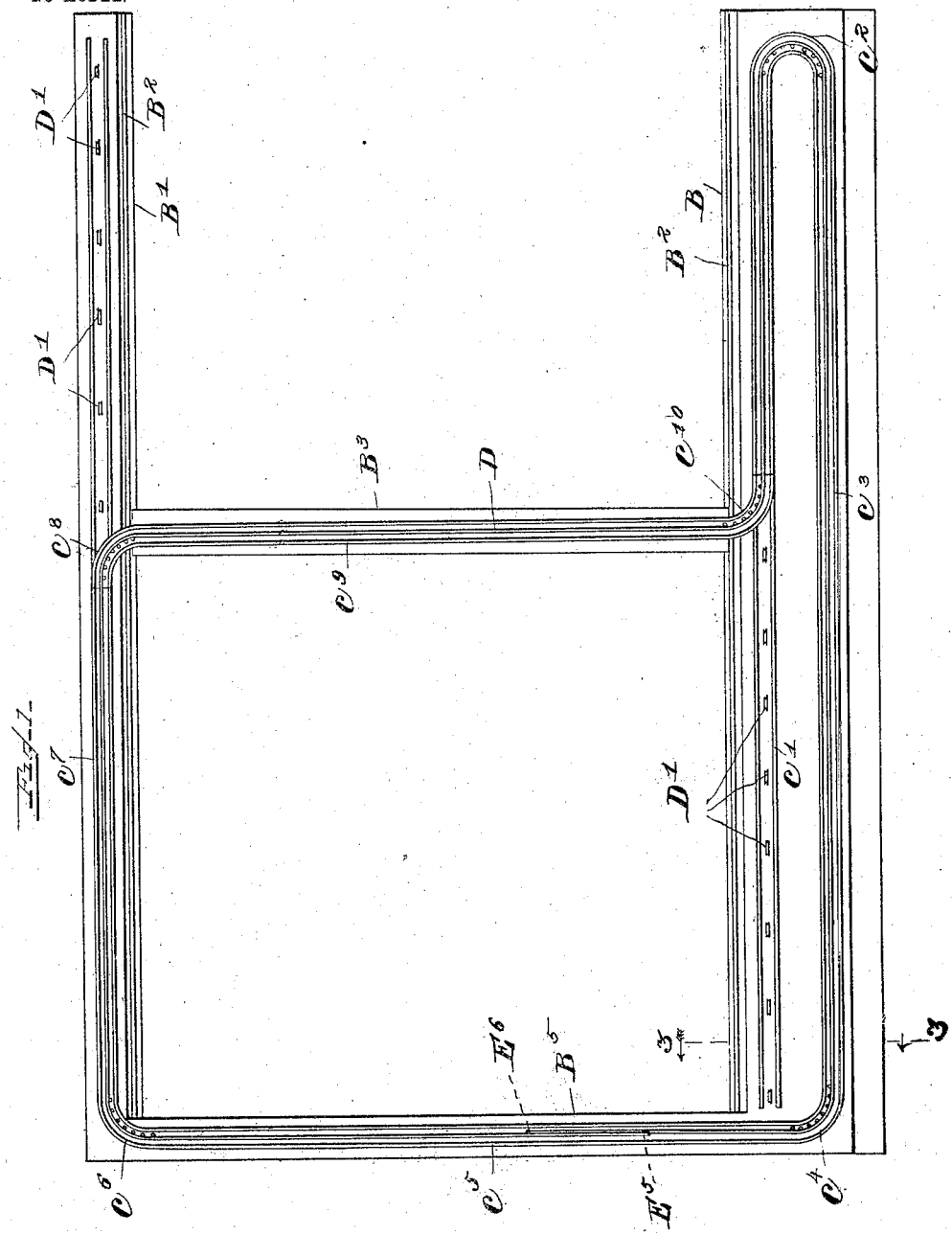

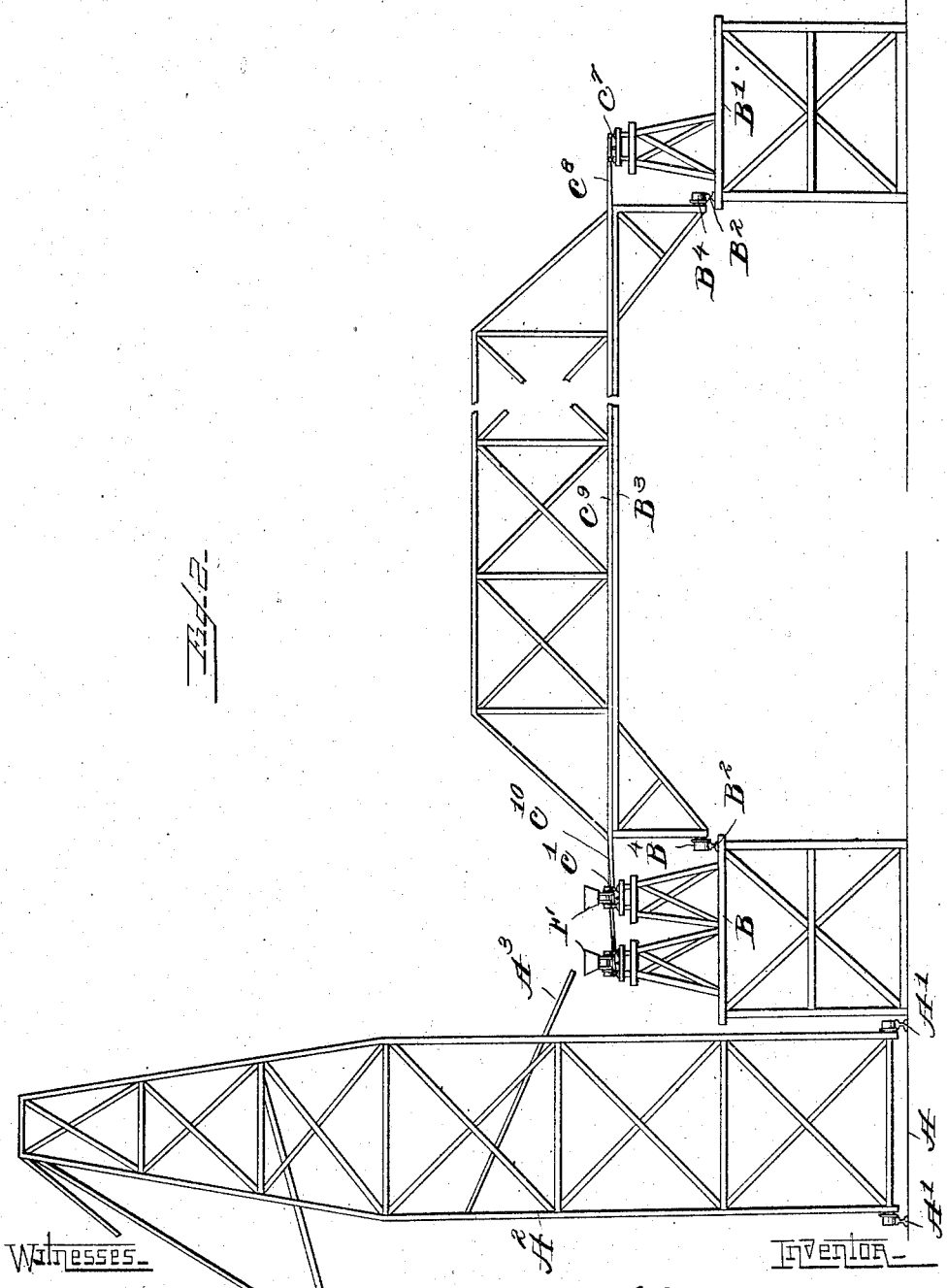

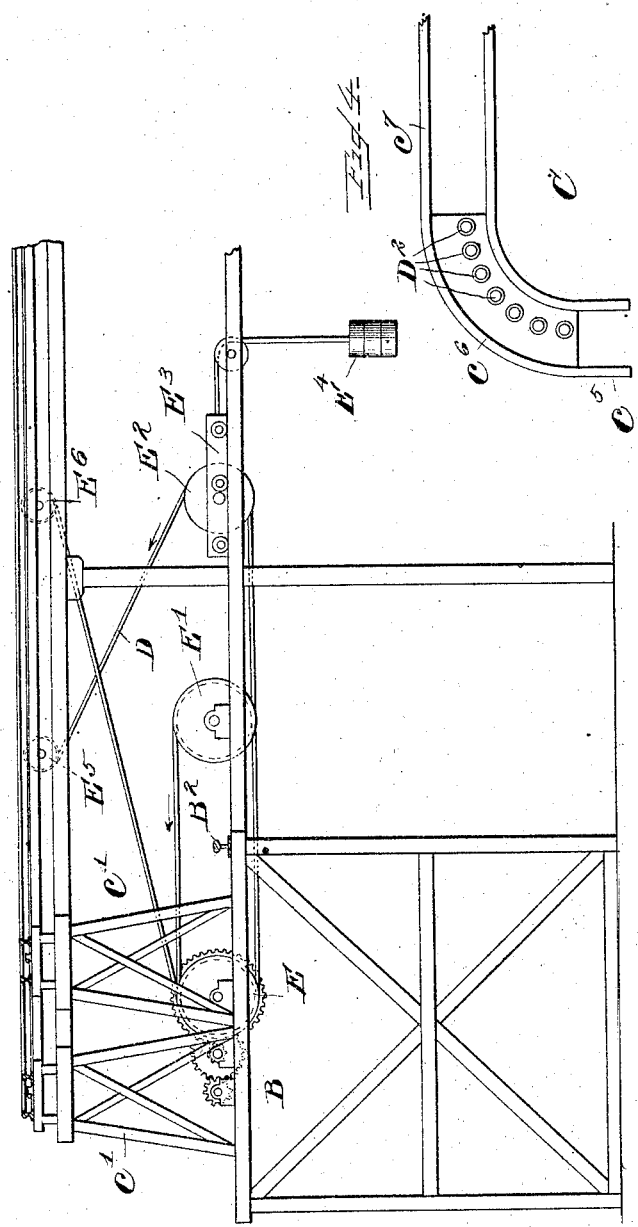

UNITED STATES PATENT OFFICE.

CHARLES BERGHOEFER, OF CHICAGO, ILLINOIS.

CONVEYER SYSTEM.

SPECIFICATION forming part of Letters Patent No. 755,606, dated March 29, 1904.

Application filed April 25, 1903. Serial No. 154,243. (No model.)

*To all whom it may concern:*

Be it known that I, CHARLES BERGHOEFER, a citizen of the United States, residing at Chicago, in the county of Cook and State of Illinois, have invented certain new and useful Improvements in Conveyer Systems, of which the following is a specification.

This invention relates to conveyers, and refers particularly to a loading and unloading system having a movable bridge for spanning the storage dock or yard upon which the system is erected.

The invention further refers to a cable system for said conveyer and to the adaptation of said cable system to the movable bridge.

The invention further refers to improvements in the general structure and arrangement of the parts of said conveyer system.

In the accompanying drawings, Figure 1 is a diagrammatic top plan view of a conveyer system embodying this invention. Fig. 2 is a side elevation of the system, being partially broken away. Fig. 3 is a detail sectional view on dotted line 3 3 of Fig. 1, showing the driving means for the cable. Fig. 4 illustrates one of the stationary curves in the traction-track.

In the embodiment herein shown the invention is adapted to a dock for loading or unloading vessels moored thereto, and referring to the drawings, A indicates the top of the dock, A' rails along the water edge thereof, and $A^2$ a loading-tower movably mounted on said rails to bring said tower to the desired position to load or unload a vessel lying at the dock. The loading-tower $A^2$ is of common construction and comprises a clam-shell elevating mechanism (not shown) and a delivery-spout $A^3$ for conveying the material elevated by the clam-shell mechanism to the conveyer system, the subject of this invention.

On the dock A, just back from the track A' and mounted upon suitable supports, is an elevated platform B, to be hereinafter referred to as the "front" platform, and at some distance rearward from said front platform and extending parallel therewith is a back platform B', also elevated above the dock A. The elevated platforms B and B' are each provided with a rail $B^2$, extending along their inner edges throughout their entire length, and these rails support a traveling bridge $B^3$, the wheels $B^4$ of said bridge resting on said rails $B^2$, whereby the bridge is capable of movement to any point in the length of said platforms B and B'. At one end of the dock the platforms B and B' are joined by means of the end platform $B^5$, also elevated to correspond with the platforms it connects.

A traction-track C is elevated by means of a structure C' above the platforms B, B', and $B^5$ and extends twice across the length of the front platform B, traversing also the end platform $B^5$ and the back platform B' and crossing the bridge $B^3$. For convenience in reference I have indicated the several straight portions of this traction-track as $c'$, $c^3$, $c^5$, $c^7$, and $c^9$ and the intervening connecting-curves as $c^2$, $c^4$, $c^6$, $c^8$, and $c^{10}$. The curves $c^8$ and $c^{10}$ extend in opposite directions and are fixed at the ends of the bridge-track $c^9$, being carried by said bridge, of which they are a part. The free ends of these curved portions of track are flattened in order to slide upon and communicate with the straight lengths of track $c'$ and $c^7$ upon the front and rear platforms B and B', respectively. If it be desirable or necessary, the free ends of these curve-sections $c^8$ and $c^{10}$ may be carried upon small wheels and plates (not shown) laid within the rails of the track-sections $c'$ and $c^7$ for said wheels.

A cable D is adapted to traverse the circuit of this conveyer system, said cable being supported upon the sheaves D', placed between the rails of the traction-track C at suitable intervals throughout the length of said track, and at the curves of said track is guided by the sheaves $D^2$. To travel the cable D, a driving mechanism of any suitable construction is provided in the structure or at any convenient point adjacent thereto. In this instance it has been placed in the structure supporting the end platform $B^5$ and comprises a driving-drum E, an auxiliary drum E', and a tightener-pulley $E^2$, said latter pulley being supported in a carriage $E^3$, having the usual counterweight $E^4$ to hold the cable taut. As will be understood, the cable makes several turns about the driving-drum E and the auxiliary drum E' and from the tightener-pulley $E^2$ to the circuit passes over a guide-sheave $E^5$ and from the circuit to the driving-drum E over a similar sheave $E^6$.

Grip dumping-cars F of common construction are adapted to engage the cable D and be drawn by it upon the track C around the cable-circuit.

In operation the loading-tower $A^2$ is moved upon its track into a convenient position to load or unload a vessel lying at the dock. We will say for the purpose of this description that the vessel is to be unloaded and its cargo placed upon the dock. The elevating mechanism in the tower raises portions of said cargo, and by means of the loading-chute $A^3$ the material is placed in the grip-cars F, standing upon the sections $c^3$ of the traction system C. When the car is filled, its grip mechanism is caused to engage the cable D, and the travel of said cable causes said car to be moved along the sections $c^3$ of the track C, around the curve $c^2$, along the section $c'$ to the curve $c^{10}$, around said curve, and onto the bridge track-section $c^9$. At the proper point on the bridge the car is dumped and its contents thrown onto the dock A. The movement of the car, however, continues with the cable, and it passes off from the bridge-section of track $c^9$ over the curve $c^8$, along the section $c^7$, around the curve $c^6$, over the section $c^5$, around the curve $c^4$, and on the track $c^3$ to the starting-point, where it is disconnected from the cable D, again loaded, and started on its way around the circuit just described. When that portion of the track beneath the bridge becomes filled, said bridge may be moved along its rails into a new position and the work of unloading the vessel at the dock continued, for, as will be seen, the length of cable on the circuit is neither increased nor diminished by a change in the position of said bridge relatively to the remainder of the system.

When it is necessary to reverse the operation and load vessels from the dock, a clamshell mechanism is mounted upon the bridge and the material lying upon the dock transferred to the hold of the vessel.

The apparatus herein described is susceptible of many modifications in the form and arrangement of its parts without departing from the spirit and scope of my invention, wherefore I desire to have it understood that I do not limit myself to the particular form herein shown.

I claim as my invention—

1. In a conveyer system, in combination, an endless traction-track, one portion of which is movable relatively to other portions thereof; and a cable-circuit on said traction-track.

2. In a conveyer system, in combination, two parallel stationary supporting structures; a stationary structure connecting one end of said parallel structures; a structure extending between said parallel structures and movable longitudinally thereof; an endless traction-track upon said structures; and a cable-circuit on said traction-track.

3. In a conveyer system, in combination, a stationary track comprising three parallel sections and a section uniting the two outer parallel sections; and a movable section uniting one of the outer parallel sections with the intermediate parallel section.

4. In a conveyer system, in combination, a stationary track comprising three parallel sections and a section uniting the two outer parallel sections; a movable section uniting one of the outer parallel sections with the intermediate parallel section; a cable-circuit on said stationary and movable sections; and means for traveling the cable.

5. In a conveyer system, in combination, a stationary track comprising three parallel sections and a section uniting the two outer parallel sections; a movable section uniting one of the outer parallel sections with the intermediate parallel section; and a loading-tower movable longitudinally of one of the outer parallel sections of track.

CHARLES BERGHOEFER.

Witnesses:
L. KUEBLER,
L. L. MILLER.